Sept. 21, 1943.                G. KEINATH                2,329,840
                          ELECTRIC GAS ANALYZER
                          Filed May 12, 1941
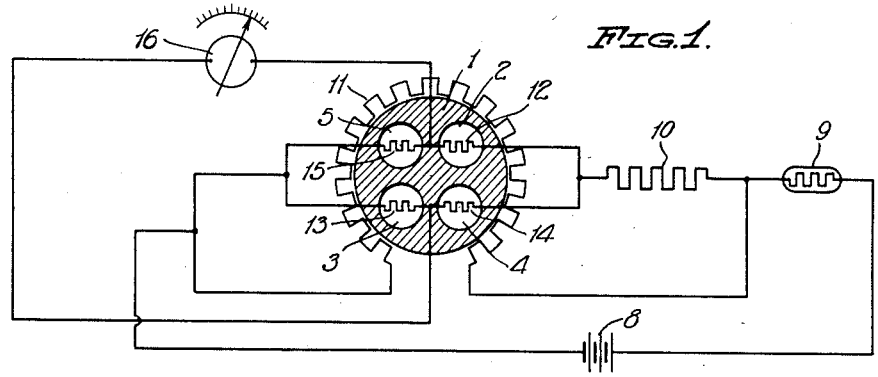
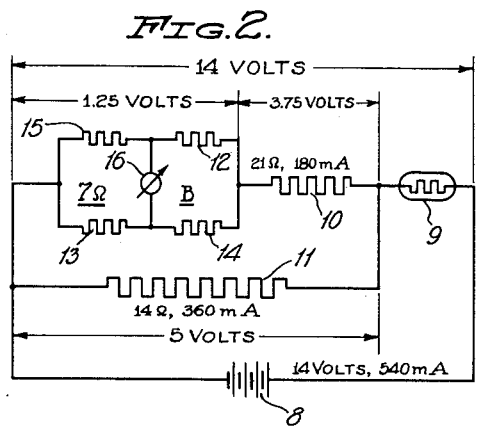
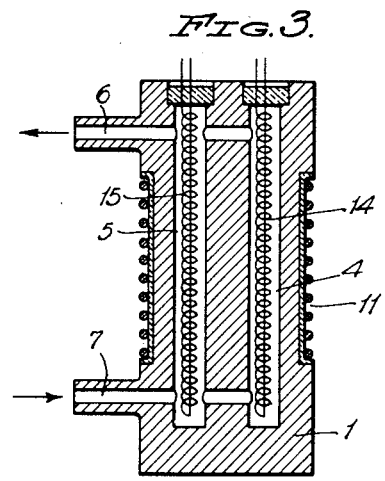
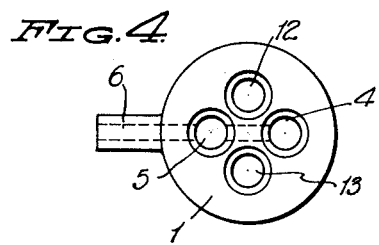
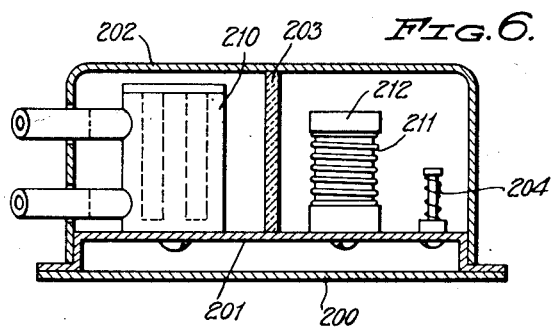
INVENTOR.
GEORGE KEINATH.
BY
ATTORNEYS.

Patented Sept. 21, 1943

2,329,840

UNITED STATES PATENT OFFICE 2,329,840

ELECTRIC GAS ANALYZER

George Keinath, Larchmont, N. Y.

Application May 12, 1941, Serial No. 393,143

8 Claims. (Cl. 73—51)

My invention relates to electrical apparatus for gas analyses and, more particularly, to gas-analytical apparatus wherein changes in the thermal conductivity of the gas to be tested are used as a measure of the changes in composition of the gas.

It is known to provide apparatus of the above-mentioned type with electrical resistance "spirals" with a high temperature coefficient of resistance, and to expose some of the spirals to the gas to be analyzed and others to a known or standard gas. The spirals are arranged in cells formed by bores of a heat-conductive cell block and connected with one another to form a Wheatstone bridge whose diagonal or zero branch contains a measuring instrument. The spirals are heated by the current of the bridge circuit. The circuit changes its balance conditions and effects a corresponding indication of the measuring instrument when a change in the composition of the test gas and hence a change in its thermal conductivity and in the temperature of the appertaining resistance spirals occurs.

The accuracy of measurement of such apparatus depends upon the constancy of the bridge current and is also affected by changes in the temperature of the ambient air and other thermal influences. Therefore, it has also become known to provide the circuit of gas analyzers with auxiliary devices for maintaining a constant current and for compensating the effects of changes in the ambient room temperature. According to a known apparatus, for instance, a thermoresponsive resistor exposed to the ambient air is connected in parallel to the bridge arrangement proper in order to compensate the effect of exterior temperature changes on the indication of the apparatus.

However, the accuracy of the known gas-analyzing apparatus is rather limited and, for certain measuring purposes, far from perfect. This is true, for instance, with respect to exhaust analyzers to be used on airplanes for determining the composition contents of hydrogen ($H_2$) and carbon dioxide ($CO_2$) of the exhaust gases. When analyzing $CO_2$, the change in the temperature of the resistance spirals, forming the Wheatstone bridge, is so slight that disturbing temperature effects are apt to bias and falsify the measuring result to a considerable extent, and the known apparatus are not capable of compensating this effect satisfactorily.

It is an object of the present invention to provide an electric apparatus for gas analyses which is free of the above-mentioned defects and, in particular, is of increased reliability and accuracy in operation if used under conditions where the changes in heat conductivity or temperature to be reacted upon are as slight as above indicated.

Another object related to the foregoing is to provide an electric apparatus for gas analysis which complies with the exacting requirements of an exhaust analysis on airplanes.

An object also is to reduce in apparatus of the above-mentioned type the time that has to elapse from the switching-in of the electric measuring circuit until the moment when the apparatus has attained the final thermal condition required for its proper operation.

These and other objects of the invention will be understood from the following description.

According to the invention, the bridge circuit proper of an electric gas analyzer of the type above described is series arranged with a thermoconstant resistor of at least about equal resistance, and this series arrangement is connected in parallel with a thermoresponsive resistor which has a greater temperature coefficient as compared with the resistance bridge, yet as regards its time lag when responding to changes in temperature is substantially similar to the thermal properties of the resistance bridge including the heat-conductive cell block enclosing the resistance spirals. The resistance of the parallel resistor is so dimensioned that the power consumption (wattage) in the series and parallel resistors is a multiple of, and preferably greatly preponderant to, the total power consumption in the resistance spirals of the bridge circuit proper.

When speaking of resistance "spirals," I use this term as customary in the art. In fact, however, these resistance bodies are not strictly of spiral shape but are usually formed like a screw helix and arranged so as to have the axis of the helix substantially coaxial with the bore or cell of the cell body.

The thermal similarity of the parallel resistor and the cell-block unit is obtained, according to the invention, by arranging the parallel resistor immediately on the cell block containing the spirals or by mounting the parallel resistor separately and providing it with sufficient mass to form a unit of about the same thermal lag as the cell block. In the latter case, the parallel resistor is preferably mounted on a support or carrier of properly dimensioned mass. According to another feature of the invention, care is taken that, when mounting the parallel resistor on the cell block, its arrangement is symmetrical with respect to the cells and the resistance spirals of the bridge circuit. Similarly, when arranging the parallel resistor separately from the cell block, the arrangement is so designed that the parallel resistor has either no heating effect on the spirals or the effect is symmetrical as regards the several spirals.

The invention will be more fully explained in connection with the following description of the embodiments exemplified in the drawing in which—

Fig. 1 represents diagrammatically an exhaust-analyzing apparatus according to the invention, and Fig. 2 shows the circuit diagram and the resistance values of the same apparatus.

Figs. 3 and 4 show a longitudinal section and a top view respectively of the heat-conductive cell block and resistance carrier forming part of the apparatus of Fig. 1.

Fig. 5 shows another modification of a combined cell block and resistance carrier, and Fig. 6 exemplifies diagrammatically a third embodiment of the invention in which the parallel resistor is mounted separately from the cell block and represents a replica of the cell block in thermal respect.

In Figs. 1, 3 and 4, a heat-conductive cell block 1 of the cylindrical shape, consisting of metal, is provided with four cylindrical bores or cells 2, 3, 4 and 5. The cells 4 and 5, as apparent from Figs. 3 and 4, communicate with ducts 6 and 7 serving to pass the gas to be tested, in particular the exhaust gas of an internal combustion engine, through the bores 4 and 5. The cells 2 and 3 are filled with a standard gas, for instance with air of ordinary composition.

Four helical resistance coils or spirals 12, 13, 14 and 15 are arranged in the cells 2, 3, 4 and 5 respectively, so as to have the axis of the helical coil extending longitudinally within the bores. The four spirals consist of bare metal wires and are connected with one another so as to lie in the four branches of a Wheatstone bridge circuit. The spirals 12 and 13, arranged in the cells filled with air, form opposite branches of the bridge circuit, the two other opposite branches being represented by the spirals 14 and 15 exposed to the test gas. A measuring instrument 16 forms part of the bridge circuit and is connected in its diagonal or zero branch. The energizing circuit contains a current source 8 and a resistance lamp 9 containing, for instance, an iron resistance for maintaining a constant current. A resistor 10 is series connected with the bridge arrangement of the resistors 12, 13, 14 and 15, and another resistor 11 is connected in parallel to the series arrangement of the resistor 10 and the bridge circuit proper. The complete circuit diagram is more clearly apparent from Fig. 2, where the bridge circuit proper is designated by B.

The spirals housed within the cell block 1 consist of a material of a high temperature coefficient of resistance, for instance of platinum (temperature coefficient approximately 0.4). The resistor 10 consists of a thermoconstant material, that is, of a material having a temperature coefficient substantially zero. Manganine may be used for this purpose. The resistance value of resistor 10 is at least as high as the total resistance of the bridge circuit B. The parallel resistor 11 consists of a material whose temperature coefficient of resistance is greater than that of the spirals 12, 13, 14 and 15. Nickel having a temperature coefficient of about 0.5 is preferably employed. The resistance of the parallel resistor 11 is so chosen that the power consumption in resistors 10 plus 11 is a multiple, i. e. twice and more, of the power consumption in the bridge circuit B. Practically a power consumption in resistors 10 and 11 of at least about five times the power consumed in the bridge is advisable, yet better results are obtained with a power consumption of seven or ten to twenty times the consumption in the bridge. Increasing the power consumption in resistors 10 and 11 substantially beyond twenty times the consumption in the bridge does not necessarily afford a further improvement of the desired compensation.

The voltages, resistances and current values indicated in Fig. 2 serve to illustrate an example of an exhaust analyzer for airplanes having an available operating voltage of 14 volts. In cases where 28 volts are available, the indicated resistance and voltage values may be doubled. According to Fig. 2, the total resistance of the bridge arrangement comprising the spirals 12, 13, 14 and 15, and the diagonal branch is 7 ohms. The series resistor 10 of thermoconstant material has a resistance of 21 ohms, while the resistance of the thermoresponsive parallel resistor 11 is 14 ohms. As indicated in the diagram, the voltage drop along the bridge circuit (1.25 volts) is very small as compared with the available operating voltage (14 volts). The power consumption in the parallel resistor 11 is 5×360=1800 milliwatts (mw.), the power consumption in the series resistor 10 is 3.75×180=675 mw., and the consumption in the bridge is 1.25×180=225 mw. Hence, the total current consumption in resistors 10 and 11 is 2475 mw. which is eleven times the consumption in the bridge B. Even the consumption in the parallel resistor alone is eight times the bridge consumption. The exemplified general proportion of the voltage drops and power consumptions is of importance, as will be pointed out in a later place.

When in operation, the bridge circuit is balanced when the test gas in cells 3 and 4 has a given composition. If this composition changes, the heat conductivity of the test gas as compared with that of the standard gas (air) changes correspondingly. The spirals 12, 13, 14 and 15, when in operation, are heated by the current from source 8 so as to maintain a relatively high temperature, for instance 200° C. A change in the composition of the test gas and a corresponding change in its thermal conductivity have the effect of changing the conductance of heat from the heated spirals 15 and 14 to the heat-conductive cell block 1. As a result, the spirals 15 and 14 assume a different temperature and resistance as compared with the spirals 12 and 13. This causes the bridge circuit to become unbalanced, thereby passing a current through the diagonal branch and the instrument 16. The pointer of the instrument deflects accordingly. The scale of the instrument is preferably designed to directly indicate the composition of the gas to be tested.

Insofar as just described, the general operation of the apparatus is similar to that of the known gas-analyzing apparatus. However, due to the aforementioned dimensioning of the series resistor 10 and the dimensioning and particular arrangement of the parallel resistor 11, and the thermal relationship between the resistor 11 and the bridge circuit proper, the accuracy of measurement is considerably increased and the apparatus protected from effecting faulty indications due to thermal disturbances. This will be explained in the following.

The resistance of the four spirals increases with the square of the intensity of the current traversing the spirals as compared with the spirals when not energized by the current; and a change in the energizing current of 1% effects a change in the spiral resistance of 2%. For instance, if the total current in the bridge circuit is 180 milliamps (ma.), that is, 90 ma. in each of the spirals, the temperature of the spirals increases from the normal temperature (20° C.) to 200° C., and the resistance of the spirals increases 80%, for instance from 100 ohms to 180 ohms. If, now, the current intensity varies 1%, the resistance increase varies 2% (that is, 1.6 ohms) which corresponds to a change in the temperature of the spirals of about 4° C. The changes in the temperature of the spirals caused by the changes in the composition of the gas are in the same order of magnitude. In particular in exhaust analyzers, the maximum change in spiral temperature, due to the presence of $CO_2$, is only about 5° C. Consequently, the effect of changes in the operating current is very considerable, and it will be understood that any disturbing cooling or heating effect on the spirals, in particular asymmetric effects acting differently on the four cells and spirals, must falsify the measuring result to a considerable extent. A change in the temperature in one of the spirals of only 0.05° C. may falsify the indication 1% of the indicating scale, i. e. the zero point of the indication shifts an amount corresponding to 1% of the scale. In order to maintain the zero point of the indication constant, the temperature of the spirals, when not subjected to the effect of the gas to be tested, must be kept constant within 0.01 to 0.02° C. These requirements are very exacting in view of the fact that in exhaust analyzers for airplanes, an energy of only about 0.25 watt is available for the four resistance spirals.

While a change in current intensity or an asymmetric thermal influence on the four spirals is equal in effect to a shifting of the zero point of indication, a variation in the ambient temperature affects also the sensitivity of the apparatus. In general, the sensitivity decreases with increasing ambient temperature. In the case of an exhaust analyzer, for instance, the deflection of the indicator may lag 25% within a temperature range of 5 to 45° C. due to changes in the ambient temperature, that is, when properly indicating at 5° C. the indication may show only ¾ of the actual value when the ambient temperature has increased to 45° C.

The parallel-connected resistor 11 has the effect of increasing its resistance at increasing ambient temperature to a greater extent than the bridge spirals. As a result, the distribution of current between the bridge circuit and the parallel resistor is changed at increasing ambient temperature so as to compensate the above-mentioned loss in sensitivity. For instance in the last-mentioned numerical example, the increase in ambient temperature from 5 to 45° C. causes an increase in the current flowing through the spirals while reducing the current flowing through the parallel resistor. In the known apparatus, if used under such conditions as here dealt with, the increase in current in the bridge cannot sufficiently compensate for the above-mentioned loss (25%) in sensitivity. The reason for this insufficiency is that only the difference in the temperature coefficients of the spirals (0.4%) and of the parallel resistor (0.5%) is effective in producing the current increase at increasing ambient temperature. However, since according to the invention the power consumption of the parallel and series resistors is a multiple of that in the bridge circuit proper, the compensating effect is greatly amplified. For instance, if the power consumption in the series resistor and parallel resistor is five times the power consumption in the bridge circuit (spirals) alone, the loss in sensitivity (25%) between 5 and 45° C. is fully compensated by a current increase of about 8%.

However, merely applying a thermoconstant series resistor and a thermoresponsive parallel resistor so as to render the power consumption in these resistors a multiple of the consumption in the bridge circuit proper, would fail to afford the desired result unless also some other changes are made as compared with the known analyzing apparatus. It is evident that the provision of series and parallel-connected resistors of high power consumption is apt to affect the thermal conditions of the apparatus. If the series resistor and the parallel resistor, as customary, are formed as separate spirals or units and separately placed into a casing containing the cell block, the heat developed by the parallel and series resistors is apt to cause an asymmetric heating of the spirals. As stated in the foregoing, this would be the cause of faulty indications. Furthermore, when the operation is started by switching-in the operating current, a separately mounted parallel resistor, usually a small nickel spiral, assumes its operating temperature rather quickly while the cell block with its spirals requires considerably more time. During this initial period, which may extend over one hour, the spirals in the cell block have a smaller resistance and carry a higher current than required for the proper operation. Therefore, the indications of the measuring instrument are too high. Likewise, when the ambient temperature changes, a separate nickel spiral follows such changes rather quickly while the cell block lags behind, thus again causing faulty indications.

Since, however, in the above-described embodiment, the temperature-responsive parallel resistor is in heat contact with the cell block so as to form a single thermal unit therewith, the resistance spirals within the block and the parallel resistor follow any interior or exterior change in temperature simultaneously at virtually the same rate of change. A sufficient heat contact between the cell block 1 and the parallel resistor may also be obtained if the resistor is located differently from the embodiment shown in Figs. 1, 3 and 4 as regards its arrangement relative to the cell block, yet care must be taken to dispose the parallel resistor symmetrically to the four resistance spirals in order to distribute the heating or cooling effect of the parallel resistor evenly over the four spirals, since, as explained in the foregoing, the slightest asymmetry may cause appreciable indication errors. Fig. 5, for instance, shows an arrangement in which the parallel resistor 110 is mounted on an extension 111 of the cell block 112 so as to be in symmetrical thermal contact with the cells and the spirals.

Instead of maintaining a thermal contact between the cell block and the parallel resistor, it is also possible according to the invention to arrange the parallel resistor separate from the cell block and to provide it with sufficient mass to represent substantially a thermal reproduction of the cell block. To this end, for instance, the resistance spiral of the parallel resistor is preferably mounted on a heat-conductive carrier so as to form a unit having approximately the same thermal time constant as the cell block with its four resistance spirals.

An embodiment of this type is shown in Fig. 6. 200 is the base plate of an exhaust analyzer, carrying a carrier plate 201 and a cover 202. On the carrier plate 201 is mounted the cell block 210 containing the cells and spirals substantially as described with reference to Figs. 1 to 4. In contrast to the previous embodiments, however, the parallel resistor 211 is mounted on a separate block 212 of sufficient mass to impart to the resistor-block unit a thermal time lag approximately equal to that of the cell block 210 and its spirals. The block 212 is mounted on plate 201 at a sufficient distance from the cell block 210 in order to prevent it from heating the cell block asymmetrically. As a measure of precaution, a partition 203, preferably of heat-insulating material, is placed between the blocks 210 and 212.

Since the thermoconstant series resistor does not change its resistance value at varying temperatures, it may be arranged at any convenient place, either in heat contact with the cell block or separated therefrom. Yet, care should again be taken that the series resistor does not produce any asymmetrical thermal effect on the cell block and its resistance spirals. The series resistor does not require a thermal adaptation to the cell block, and hence is usually a unit of small dimensions which can readily be mounted in any available space within the apparatus. In Fig. 6, for instance, the series resistor, indicated by 204, is mounted within the compartment of the parallel resistor.

The effect and significance of providing for equal thermal time constants of the cell block and the parallel resistor may be further elucidated by the following example. An airplane, when taking off and ascending, is subjected to sudden changes in the temperature of the surrounding air, these changes amounting easily to 20 or 40° C. within a few minutes. Suppose, now, the plane is provided with an exhaust analyzer dimensioned according to Fig. 2 but having the parallel resistor designed and arranged in the conventional way so as to have a much smaller thermal time constant than the cell block. If now during the ascending flight the temperature difference between the cell block and the parallel resistor is only 5° C., a very conservative assumption based on a change in the outer air temperature of 20° C., the change of resistance in resistor 11 would be 2.5% and the change of current intensity in the spirals 14 and 15 would be 1.6%. As a result, an error of 3×1.6=4.8% in the indication of the instrument occurs. At 40° C. change in the outer air, the error would be as much as about 10% or more. It therefore is essential not only to maintain the aforedescribed proportion between the resistance values of the arrangement but also to provide the thermal relationship according to the invention.

I claim:

1. A gas-analyzing apparatus, comprising a heat-conductive cell block having two pairs of cells, one of said pairs containing a standard gas and the other being provided with ducts for supplying the gas to be analyzed, two pairs of bare wire spirals of thermoresponsive resistance arranged in said cells respectively and connected with one another to form a bridge circuit with four bridge branches and a diagonally-connected zero branch, each of said spiral pairs having its two spirals arranged in opposite bridge branches, a measuring instrument being connected in said zero branch, a resistor of thermoconstant resistance material arranged in series with said bridge circuit and having a resistance at least as high as the total resistance of said bridge circuit, another resistor connected in parallel to said series arrangement of bridge circuit and series resistor, said parallel resistor consisting of resistance material with a greater temperature coefficient of resistance than that of said spirals and having a resistance lower than the total resistance of said series arrangement of bridge circuit and series resistor so that the wattage of said parallel resistor is more than twice that of said bridge circuit, said parallel resistor being disposed outside said cells to react on changes in the ambient temperature and placed in heat conductive contact with said block and symmetrically with respect to said spirals.

2. A gas-analyzing apparatus, comprising a heat-conductive cell block having two pairs of cells, one of said pairs containing a standard gas and the other being provided with means for passing therethrough the gas to be analyzed, two pairs of thermoresponsive resistance spirals arranged in said pairs of cells respectively and connected with one another to form a bridge circuit, said bridge circuit having the spirals of each pair arranged in opposite bridge branches and comprising a diagonally-connected zero branch, a measuring instrument connected in said zero branch, a resistor of substantially thermoconstant resistance material arranged in series with said bridge circuit and having a resistance value at least as high as the total resistance of said bridge circuit, another resistor connected in parallel to said series arrangement of bridge circuit and series resistor, said parallel resistor consisting of resistance material with a greater temperature coefficient of resistance than that of said cells and having a wattage of a multiple of that of said bridge circuit, said parallel resistor being disposed on the outer surface of said block to respond to changes in ambient temperature, and said parallel resistor being in heat-conductive contact with said block and surrounding said cells symmetrically.

3. A gas-analyzing apparatus, comprising a housing, a heat-conductive cell block disposed in said housing and having cells for receiving a standard gas and the gas to be analyzed respectively, thermoresponsive resistors arranged in said cells respectively, a measuring circuit connected with said resistors and containing a zero instrument for determining the difference between the resistance variations of said resistors, a resistor of substantially thermoconstant resistance material arranged in series with said circuit, a heat-conductive carrier arranged in said housing in spaced relation to said cell block, another resistor arranged on said carrier and connected in parallel to said series arrangement of measuring circuit and series resistor, said parallel-connected resistor consisting of resistance material with a greater temperature coefficient of resistance than that of said spirals and having a lower resistance value than said series arrangement so as to have a wattage of a multiple of that of said arrangement, said carrier and said parallel resistor having approximately the same thermal time constant as said cell block with said spirals and disposed in sufficiently close proximity to said cell block to have approximately the same ambient temperature as said cell block and thereby to have the parallel resistor react on approximately the same range of changes of the ambient temperature as said cell block, and a partition in said housing thermally separating said cell block from said carrier so as to prevent said parallel connected resistor from asymmetrically heating said spirals.

4. A gas-analyzing apparatus, comprising a heat-conductive cell block having two pairs of cells, one of said pairs containing a standard gas and the other being provided with means for passing therethrough the gas to be analyzed, two pairs of thermoresponsive resistance spirals arranged in said pairs of cells respectively and connected with one another to form a bridge circuit, said bridge circuit having the spirals of each pair arranged in opposite bridge branches, and comprising a diagonally-connected zero branch, a measuring instrument connected in said zero branch, a resistor of substantially thermoconstant resistance material arranged in series with said bridge circuit and having a resistance of at least about the total resistance of said bridge circuit, another resistor connected in parallel to said series arrangement of bridge circuit and series resistor, said parallel resistor consisting of a resistance material with a greater temperature coefficient of resistance than that of said spirals and having a resistance lower than the total resistance of said series arrangement of bridge circuit and series resistor so that the wattage of said parallel resistor is a multiple of the total wattage of said bridge circuit, said parallel resistor being arranged outside of said cells but in sufficiently close proximity thereto to have approximately the same ambient temperature as said cell block and thereby to react on approximately the same range of changes of the ambient temperature as said cell block, said parallel resistor and said cell block, when in operation, having approximately the same thermal time constant as regards temperature changes and being arranged relative to each other so as to prevent asymmetrical heating of said cells by said parallel resistor.

5. A gas-analyzing apparatus, comprising a heat-conductive cell block having two pairs of cells, one of said pairs containing a standard gas and the other being provided with means for passing therethrough the gas to be analyzed, two pairs of thermoresponsive resistance spirals arranged in said pairs of cells respectively and connected with one another to form a bridge circuit, said bridge circuit having the spirals of each pair arranged in opposite bridge branches and comprising a diagonally-connected zero branch, a measuring instrument connected in said zero branch, a resistor of substantially thermoconstant resistance material arranged in series with said bridge circuit and having at least about the same resistance as said bridge circuit, a resistance unit arranged in spaced relation to said cell block and comprising a carrier and a resistance conductor mounted on said carrier, said resistance conductor being connected in parallel to said series arrangement of bridge circuit and series resistor and having a greater temperature coefficient of resistance than that of said spirals and a wattage of a multiple of that of said bridge circuit, said resistance unit being disposed in sufficiently close proximity to said cell block to have approximately the same ambient temperature as said cell block and thereby to react on approximately the same range of changes of the ambient temperature as said cell block, said parallel resistor having approximately the same thermal time constant as said cell block and spirals so as to form substantially a thermal equivalent of said cell block and spirals, and said resistance unit being arranged relative to said cell block so as to prevent asymmetrical heating of said cells by said unit.

6. A gas-analyzing apparatus, comprising a heat-conductive cell block having two pairs of cells, one of said pairs containing a standard gas and the other being provided with means for passing therethrough the gas to be analyzed, two pairs of thermoresponsive resistance spirals arranged in said pairs of cells respectively and connected with one another to form a bridge circuit, said bridge circuit having the spirals of each pair arranged in opposite bridge branches and comprising a diagonally-connected zero branch, a measuring instrument connected in said zero branch, a resistor of thermoconstant resistance material arranged in series with said bridge circuit, a resistance unit connected in parallel to said series arrangement of bridge circuit and series resistor and having approximately the same thermal time constant as said spiral-containing cell block, said unit having a greater temperature coefficient of resistance than said spirals and a lower resistance value than said series arrangement of bridge circuit and series resistor so as to have a wattage of a multiple of that of said arrangement, said unit being arranged outside said cells but in sufficiently close proximity thereto to have approximately the same ambient temperature as said cell block and thereby to react on approximately the same range of changes of the ambient temperature as said cell block.

7. A gas-analyzing apparatus, comprising a heat-conductive cell block having a cell containing a standard gas and another cell provided with means for passing therethrough the gas to be analyzed, thermoresponsive resistance spirals arranged in said cells respectively and connected with one another to form a bridge circuit, said bridge circuit having said spirals arranged in different bridge branches and comprising a diagonally-connected zero branch, a measuring instrument connected in said zero branch, a resistor of thermoconstant resistance material arranged in series with said bridge circuit and spaced from said cell block, another resistor connected in parallel to said series arrangement of bridge circuit and series resistor and having a lower resistance than said series arrangement so as to have a wattage of a multiple of that of said arrangement, said parallel resistor consisting of a resistance material with a greater temperature coefficient of resistance than that of said spirals and being disposed outside said cells to react on ambient temperature and arranged in heat contact with said block and symmetrically as regards its thermal effect on said spirals.

8. A gas-analyzing apparatus, comprising a heat-conductive cell block having a cell containing a standard gas and another cell provided with means for passing therethrough the gas to be analyzed, thermoresponsive resistance spirals arranged in said cells respectively and connected with one another to form a measuring circuit, said circuit having said spirals arranged in different branches and comprising a zero branch containing a measuring instrument responsive to the difference in the resistances of said spirals, a resistor of substantially thermoconstant resistance material arranged in series with said bridge circuit, a heat-conductive carrier arranged in spaced relation to said cell block, another resistor arranged on said carrier and connected in parallel to said series arrangement of bridge circuit and series resistor and consisting of resistance material with a greater temperature coefficient of resistance than that of said spirals, said parallel resistor being disposed in sufficiently close proximity to said cell block to have approximately the same ambient temperature as said cell block and thereby to react on approximately the same range of changes of the ambient temperature as said cell block, said parallel resistor having a resistance lower than that of said series arrangement so as to have a wattage within the range of about five to about twenty times the total wattage of said arrangement, and said carrier and said parallel resistor together having approximately the same thermal time constant as said cell block with said spirals.

GEORGE KEINATH.